(12) United States Patent
Mukherjee et al.

(10) Patent No.: US 6,556,998 B1
(45) Date of Patent: Apr. 29, 2003

(54) REAL-TIME DISTRIBUTED FILE SYSTEM

(75) Inventors: Sarit Mukherjee, Mount Laurel, NJ (US); Walid G. Aref, New Brunswick, NJ (US); Ibrahim M. Kamel, Monmouth Junction, NJ (US); David A. Braun, Dehville, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/565,979

(22) Filed: May 4, 2000

(51) Int. Cl.$^7$ ............................................... G06F 17/30
(52) U.S. Cl. ................. 707/10; 707/1; 707/8; 707/100; 707/103
(58) Field of Search ............................... 707/1–10, 100, 707/103

(56) References Cited

U.S. PATENT DOCUMENTS

| | | | | |
|---|---|---|---|---|
| 5,970,490 A | * | 10/1999 | Morgenstern | 707/10 |
| 6,029,168 A | * | 2/2000 | Frey | 340/825 |
| 6,148,335 A | * | 11/2000 | Haggard et al. | 709/224 |
| 6,240,416 B1 | * | 5/2001 | Immon et al. | 707/10 |
| 6,381,632 B1 | * | 4/2002 | Lowell | 705/14 |

* cited by examiner

*Primary Examiner*—Greta Robinson
*Assistant Examiner*—Debbie M. Le
(74) *Attorney, Agent, or Firm*—Harness, Dickey & Pierce, PLC

(57) ABSTRACT

A distributed file system using autonomous disks is disclosed. The file system includes autonomous data disks that store the application data of the distributed file system. Legacy attribute disks store the file system's meta-data and directory structure. The directory structure is stored on the legacy attribute disks using the native file system. One of the clients of the file systems is utilized as a configuration manager to control access to the system. The distributed file system employs agents to support real-time applications and concurrent read/write to files.

21 Claims, 6 Drawing Sheets

• Volume with non-intersecting and homogeneous disks

Autonomous Attribute Disk

Autonoumous Data Disk

• Volume with non-intersecting and non-homogeneous disks

• Volume with intersecting and homogeneous/non-homogeneous disks

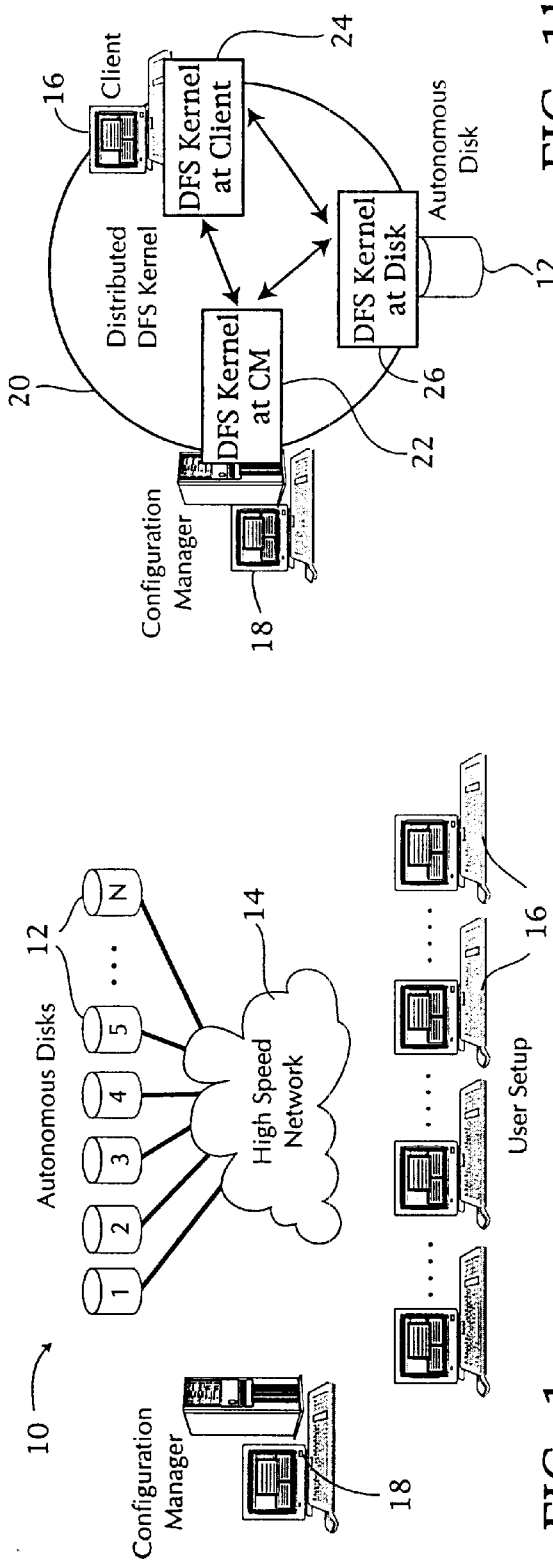
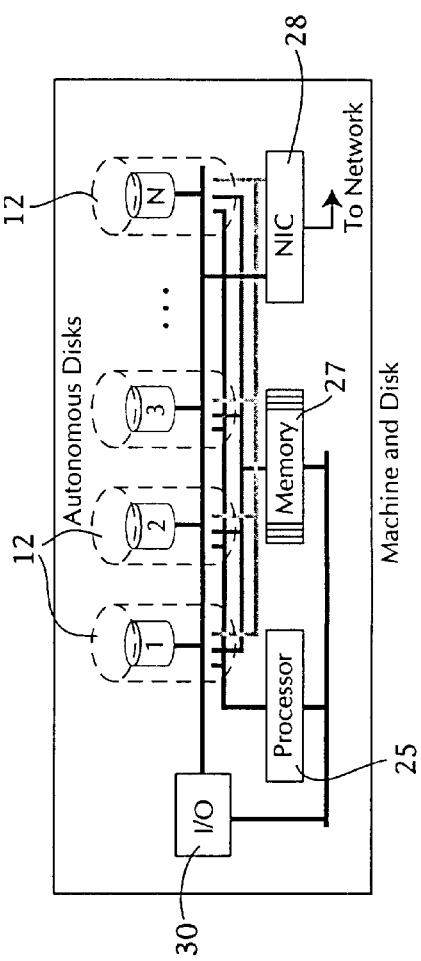
FIG. 1b
FIG. 1c
FIG. 1a

- Volume with non-intersecting and homogeneous disks

- Volume with non-intersecting and non-homogeneous disks

- Volume with intersecting and homogeneous/non-homogeneous disks

REAL-TIME DISTRIBUTED FILE SYSTEM

CROSS-REFERENCE TO RELATED APPLICATIONS

This application claims the benefit of the filing date of U.S. provisional application No. 60/142,489 filed Jul. 6, 1999.

BACKGROUND OF THE INVENTION

1. Field of the Invention

This invention relates generally to distributed file systems and, more particularly, to an architecture and implementation of a real-time distributed file system.

2. Discussion of Related Art

Advances in networking and storage technology, along with the digitization of multimedia streams have created the need for large and fast servers. The servers are typically used as repositories connected to a network. Multiple client hosts are able to use them online over the network. The clients mount the file system on their hosts and use the server functionalities seemlessly.

Multimedia servers can be of three types: centralized, distributed or serverless. In a centralized server a single dedicated node controls the admission process as well as all other file operations and security issues. In a distributed server environment, a set of designated nodes shares the load and functions of the server. In a serverless system, all the clients and the storage devices are connected directly to the network.

Generally, a distributed file system that is implemented in a server environment includes a distributed directory structure that is independent of the file system associated with the individual computers. The distributed directory structure is replicated and stored on the individual computers. The overhead associated with replicating and storing the distributed directory structure is large, and this degrades the performance of the overall file system.

Additionally, conventional distributed file systems lack a method for bandwidth access control. Therefore, as clients increase the number of accesses to the file system, increasing demands are placed on the system resources of the file system, resulting in an inability to support real-time applications.

Accordingly, there exists a need for an improved method of implementing a distributed file system. The system should reduce the overhead associated with storing the distributed file system directory structure and with storing the application data. The system should also increase the performance of the distributed file system, and it should provide for scalability of the storage system. The system should also be independent of the network and its protocols. There also exists a need for a real-time distributed file system.

SUMMARY OF THE INVENTION

The present invention provides a distributed file system for storing and retrieving information to and from one or more storage systems over a network by one or more host systems. The preferred storage system is a device we call the autonomous disk (AD). The AD is a disk or other storage medium that has an associated processing engine. Because the file system advantageously places low processing demands upon this processing engine, the AD can be implemented using a relatively small, low cost processor.

The file system of the invention comprises a storage system kernel or agent residing on the AD storage system. The storage system kernel includes a free list management system that determines the physical storage location of information stored on said storage system. The file system works in conjunction with a directory structure system residing on the host system that defines a logical organization of a plurality of files corresponding to information stored on said storage system. The file system can be implemented using an existing file system associated with the host, if desired.

A legacy attribute data store, coupled to said network, stores meta-data associated with said information stored on said storage system. Host systems can access this meta-data to determine the physical storage location of the information stored on the ADs.

The file system further comprises a client kernel or agent residing on said host system that has access to meta-data from said legacy attribute data store. The client agent is interoperative with the directory structure system to associate the plurality of files with corresponding physical storage locations. Using this information a host may retrieve information from the storage system for delivery to the host system over the network.

Autonomous disks employed in a presently preferred embodiment of the invention provide flexibility in designing a file server. They can be used to build a distributed file system by delegating tasks among multiple ADs. A serverless file system can be implemented by performing file system operations in the AD. It is also possible to build a security module into an AD to prevent unauthorized use of the system. An AD can be implemented using different hardware and software means.

The distributed file system (DFS) architecture described in this invention uses the AD as a building block. The DFS has a distributed architecture with a number of storage devices connected over a network. The user hosts are also connected to the same network. One of the user hosts, called the configuration manager, is equipped to maintain distributed DFS-specific data structures, system configurations and provide access control. The kernel of the DFS is distributed across the autonomous disks, the user hosts and the configuration manager. The kernel makes the underlying operations of the system transparent to the users.

The AD is a disk or other storage medium with a small programmable memory, and it can be implemented through active network-attached disks, regular workstations or other means. The AD performs some lightweight file system related functions, and these functions are performed as a part of the DFS kernel running at the disk. It also has a network interface that allows it to connect directly to the network.

DFS data is preferably organized in volumes. Each volume consists of one or more autonomous data disks, a type of autonomous disk. A data file is striped across the data disks of the volume. The file system meta-data for the volume is stored in another autonomous disk called the legacy attribute disk (LAD). The distributed file system directory structure is stored on the LAD using its native file system. This scheme allows the DFS to treat the control mechanisms and data separately, thereby reducing overhead. The file system supports real-time applications and provides scalable data storage.

The above described system is only an example. Systems in accordance with the present invention may be implemented in a variety of ways.

BRIEF DESCRIPTION OF THE DRAWINGS

These and other objects of the present invention, as well as the advantages thereof over other file systems will become apparent to those skilled in the art from the following detailed description in conjunction with the attached drawings.

FIGS. 1 (a–b) illustrate the architecture of a presently preferred embodiment of the distributed file system;

FIG. 1(c) shows a PC implementation of autonomous disks;

DETAILED DESCRIPTION OF THE PREFERRED EMBODIMENTS

Figure 2:
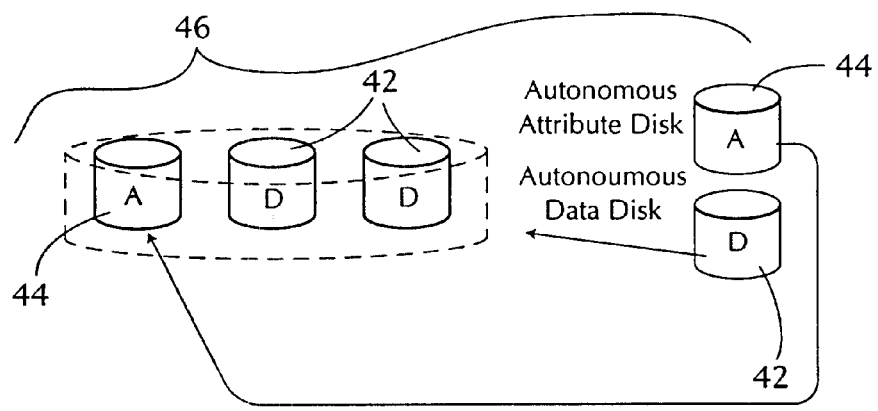
FIG. 2 shows a distributed file system volume.

FIG. 1(a) shows the file system, generally at 10, which has a distributed architecture. The architecture has a number of storage devices, called autonomous disks (AD) 12, connected to a network 14. In the preferred embodiment, the network 14 is a high-speed network capable of supporting the system's large bandwidth; however, the system can be implemented using various speeds and types of networks. The user hosts 16 are connected to the same network 14. The configuration manager (CM) 18 is also connected to the network and maintains and distributes system-specific data structures and configurations. The CM can itself be a user host.

FIG. 1(b) shows the distributed DFS kernel 20. The kernel 20 is distributed across the CM 18, the user hosts 16 and the ADs 12. The portions of the DFS kernel at the CM 22, user hosts 24, and ADs 26 work together to seamlessly provide the user hosts 16 with a transparent view of the underlying distributed file system. The user hosts 16 are unaware of the protocols and procedures used to read and write data in the DFS.

The autonomous disk (AD) 12 is an active disk; it preferably contains a small programmable processor and memory. The AD 12 can be implemented through active network-attached disks, regular workstations or other means. The AD 12 has a network interface that connects it directly to the network 14. The processor on the AD 12 performs some file system related functions. These functions are performed as a part of the DFS kernel running at the disk 26. The functions preferably include: free list management, network protocol processing and packet transmission, disk request scheduling and access security control.

FIG. 1(c) shows a PC implementation for providing multiple ADs 12 with a single processor 25, memory 27, network interface card (NIC) 28, and I/O bus 30. The processor 25 performs the file system and processing functions required for each AD 12. The memory 27 and NIC 28 provide computational space and a connection to a network 14. The processor 25, memory 27, NIC 28 and disks 11 are interconnected over the shared I/O bus 30. Multiple ADs 12 can be implemented on one PC so long as the aggregate disk bandwidth does not exceed the aggregate network bandwidth supported by the PC and NIC combination. The address of an AD 12 is simply the tuple consisting of the host address of the PC and disk ID.

Unlike a legacy file system, where the host maintains the free list of the blocks, and on-demand allocates and de-allocates blocks from the list, the DFS kernel at the AD 12 performs this set of functions. The AD 12 also performs a subset of protocol processing. In a preferred embodiment the network protocol is the Internet Protocol; however other protocols may be used. The data-link layer for the AD 12 can be Fibre Channel or another MAC (e.g., Fast or Gigabit Ethernet). The disk resident processor conducts intelligent request scheduling. The scheduling algorithm should be programmable; however, it is possible to use a non-programmable algorithm. Since the AD 12 connects directly to the network 14, it may be subject to security attacks; therefore, it should perform its own access security checks.

FIG. 2 shows a pictorial representation of the volume organization 46 in a DFS. The file system stores the application data and the meta-data separately. Two types of disks are used: autonomous data disks (ADD) 42 and legacy attribute disks (LAD) 44. A DFS volume 46 consists of a number of ADDs 42 and at least one LAD 44. Files on a volume 46 with multiple ADDs 42 are striped. It is possible to have multiple volume share the same LAD 44 by splitting the LAD 44 into several partitions; one for each DFS volume.

The Configuration Manager (CM) 18 for a DFS maintains all the file system meta-data related to the volume configuration and users' permission information. In order to access a DFS volume 46, a user 16 logs into the system through the CM 18. Upon logging into the DFS through the CM 18, a user 16 gets access to the volumes 46 for which it receives authorization. The CM 18 also informs the LADs 44 and ADDs 42 about the active users 16 who can access them.

Figure 3:
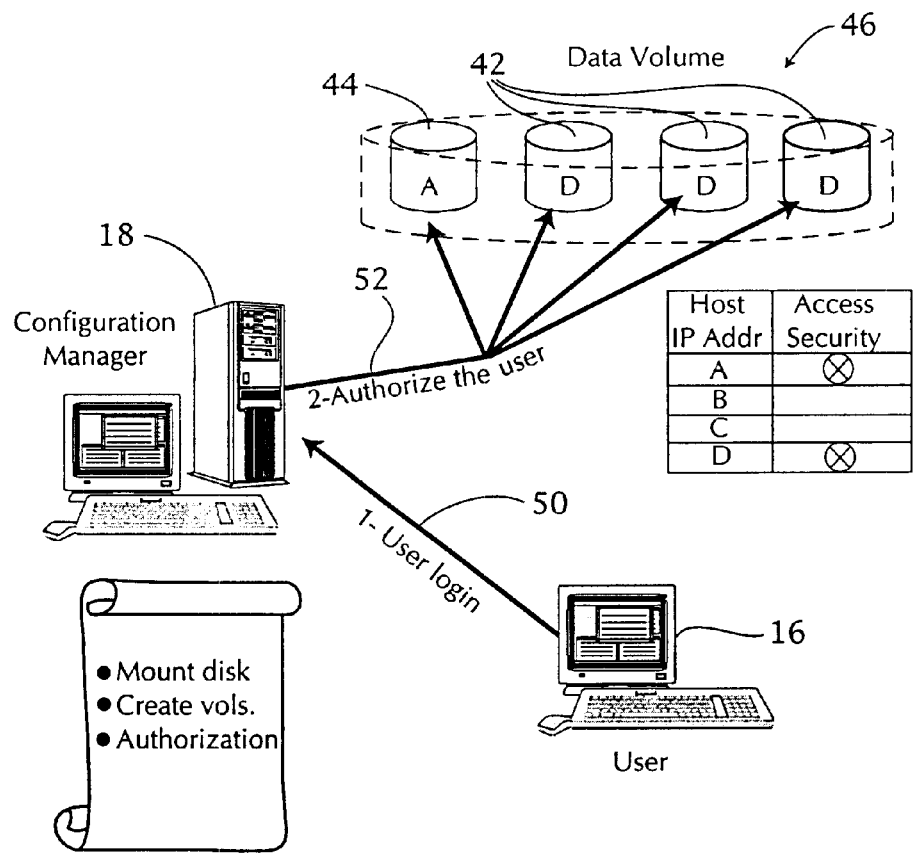
FIG. 3 shows a process for logging into the distributed file system.

FIG. 3 shows an outline of the user login procedure into the DFS. When a new user 16 wishes to access a DFS volume, the user first logs into the system by sending the Configuration Manager 18 a login request 50. The CM 18 verifies the user 16 and authorizes it to use the volumes 46 that it has permission to access (read and/or write). The CM 18 only performs a volume level access authorization.

Once the CM 18 authorizes the user 16, it informs the ADDs 42 of the user's identity, shown at 52. The ADDs 42 add the user's identity to their respective access control list. When a request comes to an ADD 42, it first verifies that the request is stamped with a valid identity, and then processes the request (read or write). If the user identity is not present in the access control list of the ADD, the request 50 is silently rejected without any report sent to the originating user 16.

Figure 4:
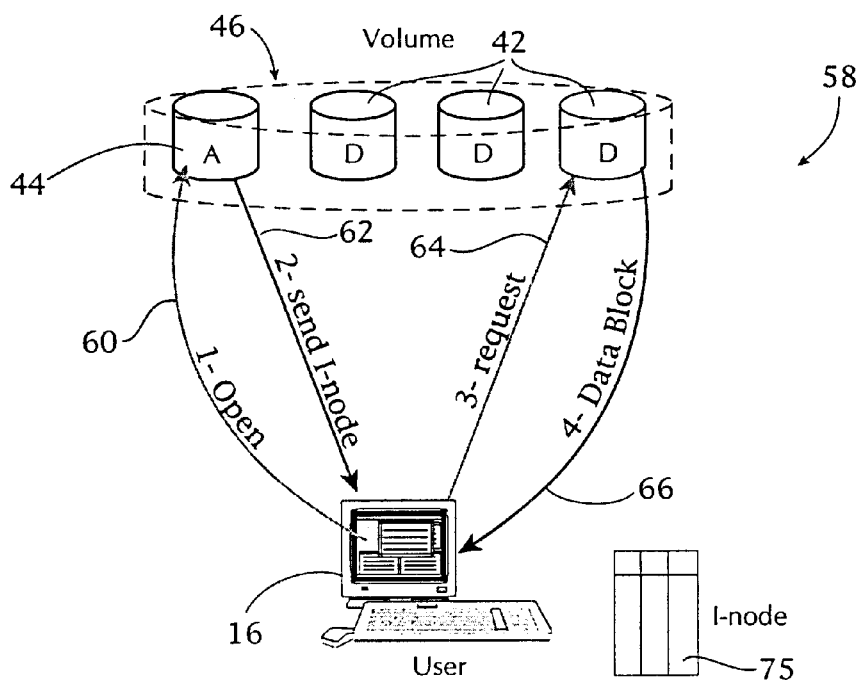
FIG. 4 shows a read operation in the distributed file system.

FIG. 4 shows a high level view of the DFS read procedure. The client 16 is allowed to perform this operation only after it has logged in and has been authorized to access the volume 46, as previously discussed above. In response to an application's read request, the DFS kernel running in the user host 16 first contacts the LAD 44 of the volume 46 for the attributes of the file to read, shown at 60. Among other information, the LAD 44 returns the file index table 75 to the user 16, shown at 62. Using the file index table, the DFS kernel at the user host 16 translates a read request into a set of one or more transfer requests to one or more ADDs 42. The transfer requests include the addresses of the ADDs 42 and the blocks to read from the ADDs 42. The request is then sent to the ADD 42, shown at 64. The ADD 42 returns the requested data block, shown at 66.

Figure 5:
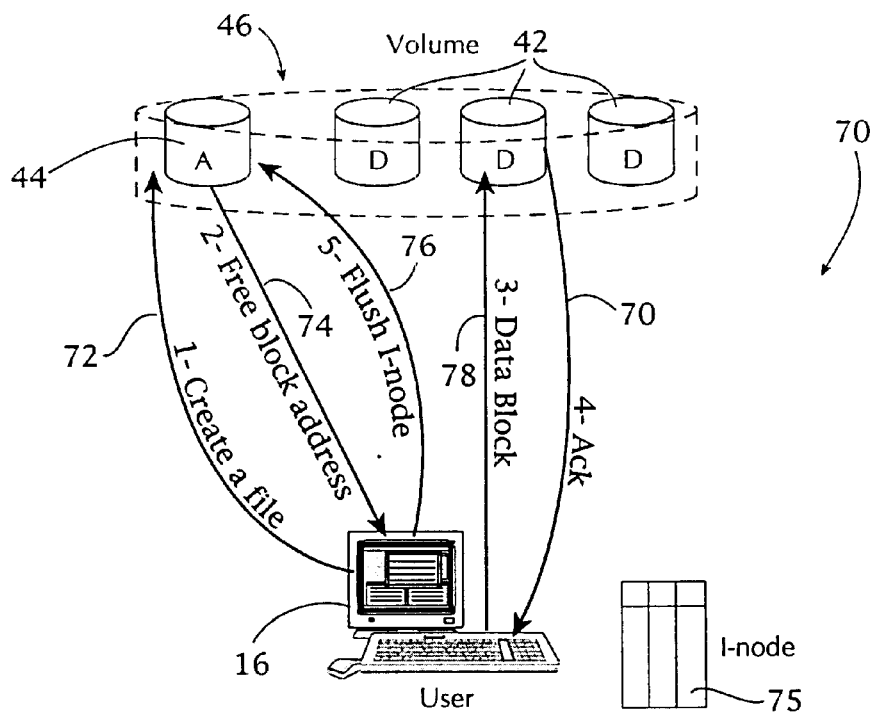
FIG. 5 shows a write operation in the distributed file system.

FIG. 5 shows a high level view of a DFS write operation 70. The write operation 70 is slightly different from the read operation 58, because a file index table corresponding to the requested file may not exist in the LAD 44 of the volume 46 to which the user 16 writes. The user 16 sends a request to create a file, shown at 72. In response, the LAD 44 sends a free block address 74 to the user 16. The user 16 creates the file index table 75 as the file is being written and then sends the table into the volume's LAD 44, shown at 76. For each write operation from the DFS kernel at the user 16, the block of data is sent to the ADD 42, shown at 78. The ADD 42 selects a free block an associated free list to hold the data, and sends the block address to the user 16, shown at 80. The user builds the file index table 75 from this information and this file index table is sent to the volume's LAD 44, shown at step 76.

The DFS uses data forking where the application data and the file system meta-data are stored separately. The ADDs 42 store the application data, and the LADs 44 store the meta-data. The bandwidth seen by an application from a volume 46 is mostly limited by the ADDs 42 and not by the LADs 44. Increasing a volume's stripe size increase the volume's aggregate bandwidth.

Figure 6:
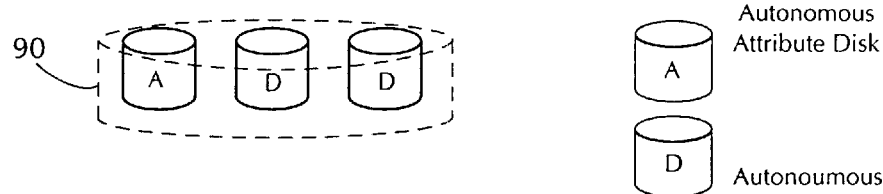
FIG. 6 shows different volume configurations of a presently preferred embodiment of the distributed file system.
Figure 6:
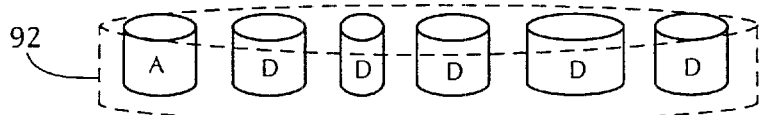
Figure 6:
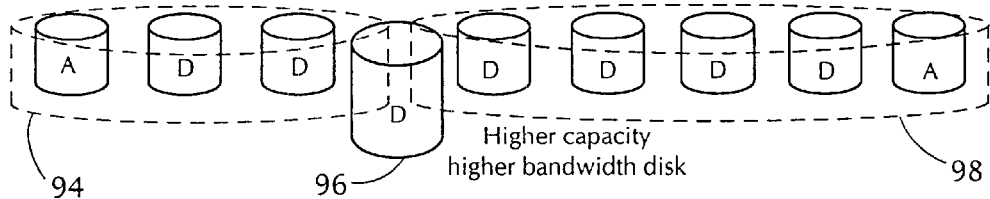

FIG. 6 shows different volume configurations for use in the DFS. A DFS volume 46 may consist of all homogeneous disks, shown at 90; or the volume may comprise heterogeneous disks, shown at 92, 94 and 98. This option makes the file system adaptive to changes in disk technology. The slowest ADD 42 member of a volume limits the volume's aggregate bandwidth; so the aggregate volume bandwidth is equal to the product of the number of disks and the lowest bandwidth from among the disks.

DFS allows volumes to intersect. Thus volumes 94 and 98 intersect at disk 96. An ADD 42 can be part of more than one volume. Those ADDs are called Shared ADDs (SADD) 96. A SADD 96 is not partitioned, and it simultaneously serves all the volumes of which it is a member. By allowing volume intersection, the DFS can make more efficient use disks that are significantly faster than other disks in the system. Intersecting volumes 94 and 96 are shown to be nonhomogeneous; however, it is possible to have intersecting and homogeneous volumes.

The LAD 44 plays a dual role in the DFS system. First, it is configured as the native file system of the host operating system (e.g., NTFS for Windows NT hosts, ext2fs for Linux hosts) to handle all the directory structures and functions. This includes one level of security is access, namely directory and/or file access permissions. Second, the LAD 44 stores meta-data for DFS. Each file DFS has a corresponding entry in the LAD 44.

A DFS file consists of a list of virtual blocks stored in a DFS volume 46. The layout of the blocks on the volume 46 is round-robin (with random start disk per file). The size of a block is predefined, and it is fixed per volume 46. The fixed size serves several purposes. First, it simplifies the implementation of the file system. Second, it provides more deterministic access time when compared to variable size blocks. Third, it provides more deterministic buffer allocation. Fourth, it provides more deterministic disk and network scheduling. Fifth, it reduces fragmentation; internal fragmentation is small, and there is no external fragmentation.

Each virtual block in a file has a virtual block address (VBA). Given a VBA, the DFS maps it to the appropriate logical block address (LBA) within the volume 46. Since a DFS volume 46 typically consists of multiple ADDs 42 (where the blocks are physically stored), each VBA is mapped to the LBA of the corresponding ADD 42 within the volume 46. This gives rise to a translation table that maps a VBA to a LBA and the Id of the ADD 42.

A table with these mappings is kept as a file in the LAD 44 (in the native file system) and is used as meta-data for DFS file access. This file is referred to as the attribute file. Although the table has been described to contain one entry per VBA, range mappings can be stored instead of individual address mappings. In order to access a DFS file, a user 16 must first get the corresponding attribute file. In order to implement storage level fault tolerance with complete mirroring (RAID level 1), multiple VBA-to-LBA mapping tables can be stored in the attribute file.

The attribute file stores several key pieces of information of a DFS file. An extendable structure stores the attributes. The attributes kept in the attribute file may include: file size, bandwidth requirement, magic number, media type, level of redundancy and the file index table.

File size is the size of the DFS file. The size is modified often enough to get the correct file size at any time (e.g., when a file is written, its size is continually changing). Each file, when it is written, is assigned a target bandwidth usage. This is the default bandwidth that is assumed for the file when it is opened. The user 16 changes the bandwidth usage with explicit control commands. It is possible to open a file with a bandwidth different than the default bandwidth. The magic number defines that the attribute file, although it looks like a native file, is actually a meta-data for the DFS; so, it should be treated differently. Media type defines the type of media (e.g., audio, video, text and image) and the compression mechanism (e.g., MPEG-2, DVCPro). Level of Redundancy (LoR) defines the storage level redundancy built for the DFS file. The attribute file stores as many index tables as the LoR specifies.

The CM 18 stores all the volume specific information. For each volume 46 it should keep the following information: the volume name, the ADDs associated with the stripe set, the order of the stripe set, the volume creation time, the size of the volume, the free space in the volume, the bandwidth of the volume, the free bandwidth of the volume, the block size and the default read/write bandwidth of the files within the volume.

Unlike legacy file systems where the host maintains the free list of the disks, and on-demand allocates and de-allocates blocks from the list, the processor at the disk performs the same set of functions. The ADD 42 is capable of performing a subset of protocol processing, preferable Internet Protocol; however, other protocols may be used. The data-link layer for the ADD can be Fibre Channel or another MAC (e.g. Fast or Gigabit Ethernet); preferably a high-speed protocol is used, but other choices are possible. The disk resident processor will be able to conduct intelligent request scheduling. It is desirable that the scheduling algorithm be programmable. Since the ADD 42 directly connects to the network 14 it is subject to security attacks. Therefore, it should perform its own access security checks.

For ease of implementation, and to reduce duplicative effort, DFS does not implement a directory structure of its own. It uses the directory structure of the native file system of the user hosts 16, for example, NTFS.

Figure 7:
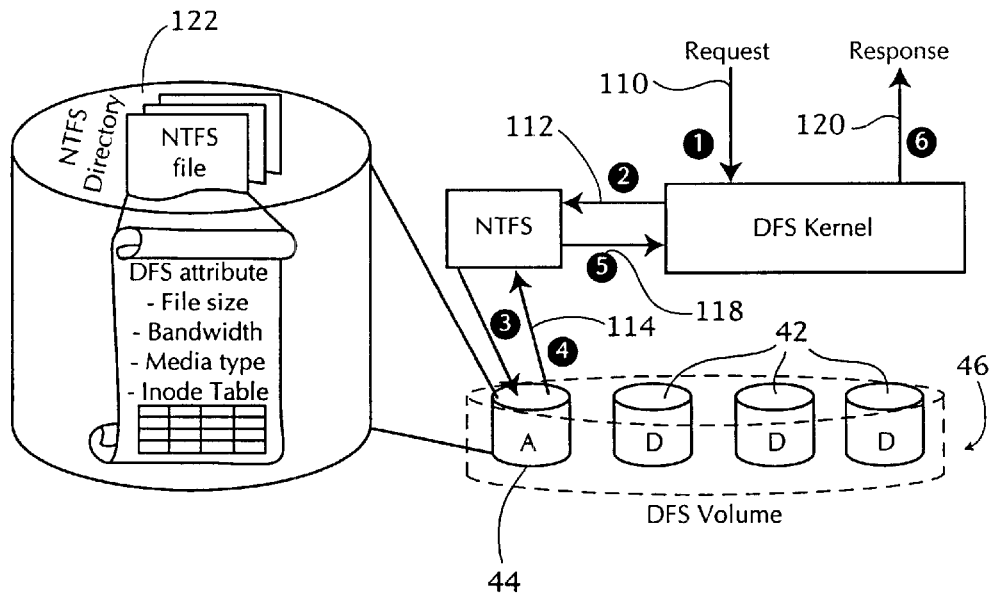
FIG. 7 shows a directory structure of a presently preferred embodiment of the distributed file system.

FIG. 7 diagrams DFS directory structure implementation and demonstrates the structure using NTFS. It should be understood that the discussion and illustrations using NTFS are merely exemplary in nature; other file systems may also be used.

Each DFS volume 46 has a LAD 44 that understands NTFS. For each "pseudo-directory" in DFS volume 46, there exists a directory in NTFS 122 residing on the corresponding LAD 44 of the volume 46. Similarly there is an NTFS file in the LAD 44 for each of the DFS files. Thus, in the implementation, the LAD 44 keeps the directory information and access control, and the ADDs 42 store and stream the application data. When an application at the user host requests a DFS file and/or directory, step 110, the DFS kernel running at the user host 16 passes to the NTFS, step 112. The NTFS contacts the LAD, step 114, and reads the corresponding attribute file, step 116, that is then passed to the DFS, step 118. The DFS then responds to the request with the appropriate data, step 120.

Figure 8:
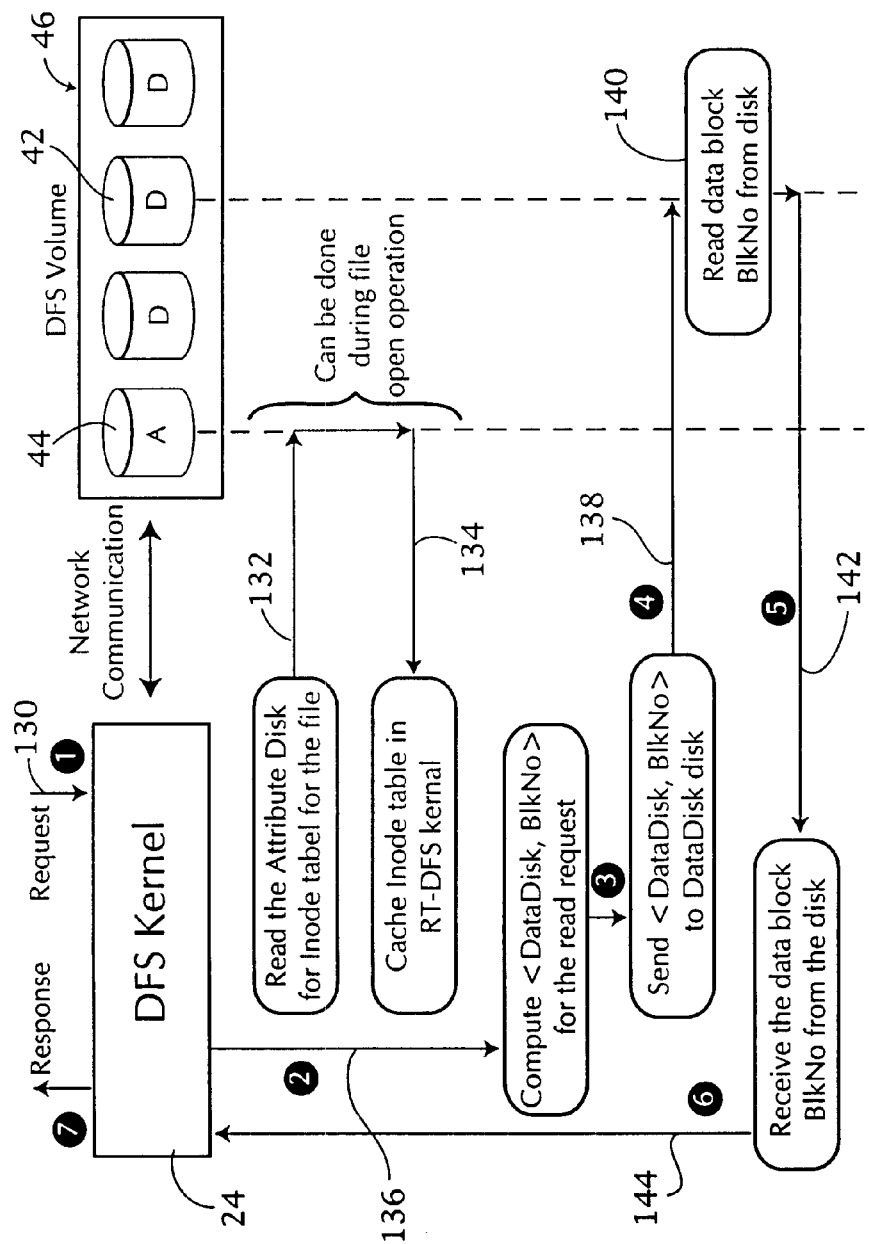
FIG. 8 shows a detailed DFS read operation.

FIG. 8 shows the detailed read operation in the file system. The DFS client kernel 24 receives a read request from an application, step 130. When a file is opened, the LAD 44 corresponding to the volume is consulted for the attribute file corresponding to the requested DFS file. The DFS client 16 that issued the read request reads the file, step 132, and caches the attribute file in its memory, step 134. The File Index Table stored in the attribute file is used as a meta-data for the DFS file.

From the read request the client DFS, using the File Index Table, computes the corresponding ADD 42 and the LBA within the ADD 42, step 136. There can be multiples of this tuple generated for a read request. Then the client DFS sends the tuple(s) to the appropriate ADD(s) 42, step 138. Each ADD 42 reads the requested LBA, step 140, and sends it back to the client DFS 16, step 142. The client then receive the data from the ADDs 42. After all the blocks are read (and side buffering is performed, if needed), the client DFS 16 sends the requested number of bytes to the application, step 144.

The write operation is described in two parts. The first part describes how a previously non-existent file is created. The second part describes how an existing file is updated. The main difference between the two parts is that in the first case the file index table does not exist.

Figure 9:
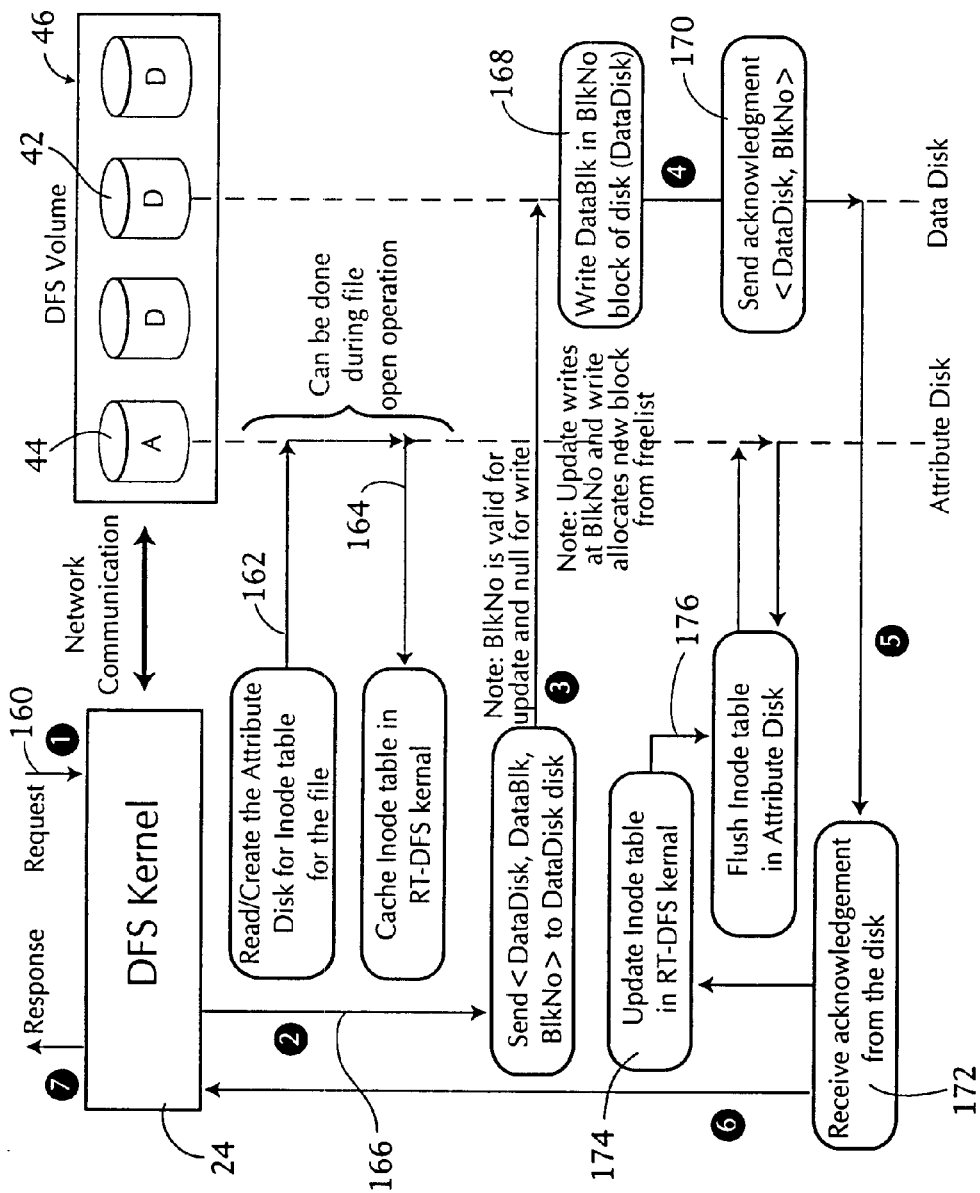
FIG. 9 shows a detailed DFS write operation.

FIG. 9 illustrates the detailed write operation. The DFS kernel at the client 24 receive a write request from an application 160. The client DFS 16 (kernel 24) contacts the DFS volume 46, where the file has to be written, for the stripe set and starts with a random start disk. The DFS client kernel 24 either reads the Inode table from the DFS volume 46, or, if none exists, it creates the table, step 162. The Inode table is cached into the kernel's memory, step 164. The first block is written on the start disk. After the first block, the blocks are written in a round-robin fashion on the stripe set. A volume 46 is considered "full" if any of the member ADDs 42 runs out of space while servicing the write request.

When a client DFS 16 receives a write request, step 160, it breaks the requested bytes into appropriate DFS disk blocks. Each block is then sent to the ADD 42 in the right stripe set sequence as a tuple consisting of three fields: the address of the ADD 42, the data block to write and an LBA initialized to (−1), step 166. The reason for having the LBA initialized to (−1) is to inform the ADD 42 that it has to allocate a free block for the data. The preferred embodiment uses an initialization value of (−1); however, other methods may be used. The ADD 42 evaluates if it has space to write the data block. If it succeeds in finding a free block, it writes the block, step 168. Next, it sends the corresponding LBA back to the client DFS as an acknowledgement, step 170. The client DFS 16 uses the LBA to construct the File Index Table for the DFS file being written. When the DFS client kernel 24 receives an acknowledgement, step 172, it updates the Inode table, step 174. In order to expedite the write procedure, the acknowledgement is sent before the block is actually written to the disk. Ideally, in order to have a consistent view of the file system, the File Index Table should be flushed back to the corresponding attribute file after each block is written, step 176; however, because of the performance hit the file index table should optimally be written back to the corresponding attribute file (step 176) less frequently.

For the update procedure, the File Index Table of the file exists in the corresponding attribute file. The client DFS 16 reads and caches the File Index Table, and maps the requested block to the updated address of the ADD 42 and the LBA (similar to the read operation). For the update operation, the client DFS 16 sends the tuple consisting of the same three fields as the write operation (as described in the previous paragraph); however, it puts the actual LBA number instead of (−1). This tells the ADD 42 to update the corresponding LBA in the disk. As an acknowledgement, the same LBA is returned to the client DFS 16.

Supporting concurrent reads among multiple DFS clients 16 is simple, because there is no update being performed on any common data structure of the system. Each client DFS 16 reads and caches the attribute file corresponding to the DFS file and read the data as previously described.

Simultaneous writes among multiple clients 16 are supported in DFS. However, the ultimate content of the file depends on the sequence in which the contending threads write into the file, and it is non-deterministic. Each writer locks the shared meta-data, particularly the file index table, for the concurrent write operations. Different writers can lock non-intersecting ranges of the table.

In the case of the concurrent reader and writer, the major concern is how the reader can get access to the latest File Index Table of the DFS file that the writer is generating. The latest copy of the File Index Table is always with the writer DFS. It is flushed out into the corresponding attribute file periodically. If the reader is faster than the writer, it may encounter the end-of-file before the writer ends the file. Since the DFS does not restrict the speed of the clients 16, it cannot ensure that such a situation will not occur. The application should be aware of this and handle any consequences; some design options may prevent this from occurring.

The reader caches the File Index Table from the corresponding attribute file (residing on the LAD) of the DFS file. The attribute file contains a flag indicating that the file is write-locked by the writer. This notifies the reader that it has to get the most up-to-date File Index Table (by re-caching it from the LAD) in the course of the process. Several variations are possible: the reader asks for the updated table periodically after a constant time period; the reader asks for the updated table after a time period which is variable based on the bandwidth usage; the reader asks for the updated table when it finds itself close to the end of the current table, or the writer sends the updated table periodically to interested readers.

The writer generates the File Index Table as it writes the file into the volume. It flushes the new entries of the table to the attribute file after every N (N is a constant) block writes. Other ways of updating are possible.

In DFS, there can be multiple readers and writers per file so long as the bandwidth constraints can be resolved. A file can be locked at the byte level by multiple applications so long as the byte ranges are non-intersecting.

The Admission Control mechanism controls the number of clients 16 admitted to the system based on each client's 16 resource demands and the current availability of those resources. The bandwidth management is concerned with enforcement of client's 16 negotiated resource usage. In DFS, the admission control is conducted at the client DFS 16, and the bandwidth enforcement is done at the ADDs 42.

The primary resources considered are the disk and network bandwidths. The processing power of the components of the system should be sufficient to support the available disk and network bandwidth of each component. Therefore, under full load the disk and network interfaces can be fully utilized. There should be enough memory for the necessary buffering and caching and the processor should be able to keep both the disk and the network busy. This also applies to ADDs 42 and DFS clients 16. A client 16 must be able to process the data requested at the rate requested.

A DFS stream is admission controlled at the client DFS 16 when the application opens the corresponding DFS file. During this time, the client DFS 16 consults the volume 46 to determine the availability of the resources. If enough resources are available, the file open operation succeeds. Otherwise, the bandwidth is not granted, and the application has the option of either opening the file in non-real-time mode, or returning later for real-time mode. Special DFS specific device I/O control mechanisms allow the application to request for a change of bandwidth allocation. The client DFS 16 also handles these requests.

After the requested bandwidth for the application is granted, admission control is invoked each time the application performs any I/O operation on that file (read/write). Allocated resources are taken back from the application when the file is closed. Admission control is performed on a DFS file at the following events: when a file is opened, when a request for bandwidth is issued, when a file is accessed and when a file is closed.

Operating systems generally don't support methods for extending the open, read and write requests. Therefore, a default delivery bandwidth requirement should be associated with each file as an attribute of either the file, its directory or the volume on which it resides. A method should exist to change the reserved bandwidth on an open file handle.

The delivery bandwidth is defined as the minimum average rate that data must arrive in the requestor's memory for the data to be useful. It is assumed that this is limited by the requestor's network interface hardware and the networking software.

Under these assumptions, AC is performed when a file is opened or closed and whenever the bandwidth requirement is explicitly changed on a file handle. When a file is opened, AC is performed based on the file's default delivery bandwidth. If there is insufficient bandwidth currently available, the file is still opened but without any bandwidth reservation (AC rejects the request). Any accesses to the file will be blocked until the delivery bandwidth is available. This allows the application to request a different bandwidth by issuing a request to change the allocation from the current or default value to another value. AC is invoked at this time to reserve the requested bandwidth. If unsuccessful, the file handle is marked again as having no bandwidth. Accesses to a file without any reserved bandwidth will be blocked until the bandwidth is available. The application is blocked when the first access (read or write) is issued. An application can explicitly set the bandwidth allocation to zero so that accesses are serviced on a best effort basis. AC is also invoked when the file is closed to release the bandwidth allocation.

The default delivery bandwidth for a new file is determined using a simple inheritance mechanism. The root directory has a default delivery bandwidth defined as one of its attributes during the initialization of the DFS volume 46. Every new file or directory inherits the delivery bandwidth from its parent directory. The default can be changed with commands varying depending on the OS and the application software.

Admission control merely decides whether admitting the request will not violate the delivery constraints of the files already admitted and whether the demands of the new file can be guaranteed as well. Admission control does not manage the bandwidth usage by a particular application that operates on a file. For this reason, a bandwidth management entity is needed. The main purpose of this entity is to make sure that an application does not get more resources (disk or network bandwidth) than requested.

The bandwidth enforcement can be conducted either at the client 16 or at the ADDs 42. For highest efficiency, it should be placed at the ADDs 42. The DFS supports "pull" mode of requests. In this model an application may ask for data at a rate higher than the negotiated rate. The requests from the application, however, should only be met at the negotiated bandwidth. It is possible for an application to use a peak bandwidth higher than the negotiated one. However, on a larger time scale, the bandwidth enforcement module makes sure the average usage is close to the negotiated value. This is enforced by associating a deadline with each block request. The deadline is computed from the bandwidth granted. The DFS makes sure that the request is not served before the deadline, if the system is loaded. This deadline is not absolute, since the host operating system does not guarantee real-time services.

DFS provides fault tolerance at different component levels. The storage and network level fault tolerances are of great interest for the type of applications DFS is designed to support.

In DFS, software-based redundancy in storage, or hardware RAID, or both can be used. A DFS volume 46 can be one of the following types: non fault tolerant, software mirrored or hardware RAID. Non Fault Tolerant Volume is the standard volume configuration. Data cannot be recovered in case of failure of any disk of the volume. In a Software Mirrored Volume each disk in the volume has an identical mirror in the system. This is a software emulation of RAID level 1, implemented without any extra special RAID hardware. Implementation of this scheme requires slight modification of the DFS data structures. A DFS volume 46 can be an entire RAID disk connected to the network. The hardware can implement any level of RAID, and it need not be known to DFS.

A fault tolerant data link layer (e.g., fault tolerant Ethernet network cards and driver software) provides the network level security in DFS. This layer, being lower in the hierarchy, does not modify any functionality of DFS.

DFS handles two levels of priority, real-time and non-real-time. The difference between these two levels is that delay and throughput are only guaranteed for real-time applications. DFS uses a simple notion to determine the priority of an application. If an application is allocated non-zero bandwidth for its operation, it is considered as a real-time application, otherwise it is non-real-time. Using DFS specific device I/O control requests, an application can dynamically switch between the two classes. Priority is only ensured at the disk access and network scheduling queues. No process execution level priority can be guaranteed because of the lack of support from the native operating system.

Any file system should have some level of access security to protect the users. Security becomes an even more important issue in DFS since the AD 12 is directly connected to the network 14, and, therefore, it is more prone to security attacks. DFS provides multiple levels of security.

DFS uses the native file system for directory and file management (built on the LAD using the attribute file). All the file and directory permission and the securities thereof are usable from DFS.

In DFS, ADDs 42 are directly attached to the network 14. Although no complete file system resides on any particular ADD 42, it is possible for an unauthorized user 16 to read the blocks from the ADD 42. Thus, it is more prone to security attacks than the conventional system. The special client authorization procedures ensure the identity of a client 16 that accesses an ADD 42.

Data security is provided through the proper encryption of the data. Although the design of DFS supports such encryption and decryption, it is not normally implemented in DFS due to the large overhead associated with encrypting and decrypting data.

While the invention has been described in its presently preferred embodiment, modifications can be made in accordance with the techniques and systems described herein, without departing from the spirit of the invention as set forth in the appended claims.

We claim:

1. A distributed file system for retrieving information from a storage system for delivery over a network to a host system comprising:
    a storage system agent residing on said storage system having free list management system that determines the physical storage location of information stored on said storage system;
    a directory structure system residing on said host system that defines a logical organization of a plurality of files corresponding to information stored on said storage system;
    a legacy attribute data store coupled to said network that stores metadata associated with said information stored on said storage system and from which the physical storage location of said stored information may be determined; and
    a client agent associated with said host system and having access to metadata from said legacy attribute data store, said client agent being interoperative with said directory structure system to associate said plurality of files with corresponding physical storage locations, whereby information corresponding to said files is retrieved from said storage system and delivered to said host system.

2. The distributed file system of claim 1 wherein said storage system comprises at least one autonomous disk having an associated processor that implements said storage system agent.

3. The distributed file system of claim 1 wherein said storage system is a serverless storage system having at least one autonomous disk that has an associated processor that implements said storage system agent.

4. The distributed file system of claim 1 wherein said storage system agent further includes a network protocol system by which said storage system is coupled for communication over said network.

5. The distributed file system of claim 1 wherein said storage system agent further includes an access security control system that mediates access to said storage system over said network.

6. The distributed file system of claim 1 wherein said storage system agent further includes a request scheduling system that mediates the order in which requests to retrieve information are performed.

7. The distributed file system of claim 1 wherein the client agent further comprises an admission control system that regulates access to the files and determines a delivery mode by which a requested file may be delivered.

8. The distributed file system of claim 7 wherein the delivery mode is real-time mode.

9. The distributed file system of claim 7 wherein the network has a bandwidth usage, the storage system has a bandwidth usage, and the admission control system regulates access to the files based on the network bandwidth usage and the disk bandwidth usage.

10. The distributed file system of claim 1 wherein the storage system includes a volume that stores data, the volume including an autonomous disk that stores application data and a legacy disk that stores meta-data.

11. The distributed file system of claim 10 wherein application data is striped across a plurality of autonomous data disks.

12. The distributed file system of claim 1 wherein the legacy disk stores meta-data associated with at least one volume.

13. A method of communicating information over a network between a storage system and a host system, comprising the steps of:
    providing a storage system agent residing on said storage system having a free list management system that determines the physical storage location of information stored on said storage system;
    providing a directory structure system residing on said host system that defines a logical organization of a plurality of files corresponding to information stored on said storage system;
    providing a legacy attribute data store coupled to said network that stores metadata associated with said information stored on said storage system and from which the physical storage location of said stored information may be determined;
    providing a client agent residing on said host system and having access to meta-data from said legacy attribute data store, said client agent being interoperative with said directory structure system to associate said plurality of files with corresponding physical storage locations, whereby information corresponding to said files is retrieved from said storage system and delivered to said host system.

14. The method of claim 13 further comprising the steps of:
    sending a first read request for a file to the client agent;
    querying the legacy attribute store a first time for meta-data associated with the file;
    translating the first read request into at least one first transfer request for a data block based on the associated metadata obtained the first time;
    sending the first transfer request to the storage system; and
    receiving the data block from the storage system.

15. The method of claim 14 wherein the storage system further includes a volume having at least one distributed data disk for storing application data and a legacy attribute disk for storing metadata;
    wherein the step of translating includes translating the first read request into at least one first transfer request to at least one distributed data disk.

16. The method of claim 14 further comprising the steps of:

sending a second read request for the file to another client agent;

querying the legacy attribute store a second time for metadata associated with the file;

translating the second read request into at least one second transfer request for the data block based on the associated metadata obtained the second time;

sending the second transfer request to the storage system; and receiving the data block from the storage system.

17. The method of claim 13 further comprising the steps of:

sending a first write request to the storage system agent;

in response to the first write request, sending a free block address to the host system;

writing a file to the storage system;

creating a file index table associated with the file; and sending the file index table to the legacy attribute data store.

18. The method of claim 17 wherein the step of sending the file index table further includes sending the file index table in sections as the file index table is created.

19. The method of claim 18 further comprising the steps of:

setting a flag in the legacy attribute data store to indicate the file is being written on;

sending a concurrent read request to the storage system agent to read the file;

in response to the read request, sending the file index table and the flag to the host system;

reading the file; and requesting updates of the file index table as the file is being read.

20. The method of claim 13 further comprising the steps of:

sending a concurrent write request to the storage system agent;

in response to the concurrent write request, sending the file index table of the file, wherein the file index table has at least two sections corresponding to portions of the file;

locking the file index table section corresponding the portion that is to be written to;

writing to the file portion;

updating the file index table associated with the file; and sending the file index table to the legacy attribute data store.

21. The method of claim 13 further comprising the steps of:

sending a request from an application to the client agent for directory information;

transferring the request to the directory structure system;

querying the legacy attribute data store to read an attribute file corresponding to the requested directory information;

receiving the attribute file;

transferring the attribute file to the client agent; and providing the requested directory information to the application.

* * * * *